US008616780B2

(12) United States Patent
Kwasniewski et al.

(10) Patent No.: US 8,616,780 B2
(45) Date of Patent: Dec. 31, 2013

(54) BEARING ADJUSTER ASSEMBLY

(75) Inventors: Dale Kwasniewski, Galesburg, MI (US);
Robert D. Kluck, Chesterfield, MI (US);
Larry Wagle, Boyne Falls, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 108 days.

(21) Appl. No.: 13/350,879

(22) Filed: Jan. 16, 2012

(65) Prior Publication Data

US 2013/0182983 A1 Jul. 18, 2013

(51) Int. Cl.
*F16C 23/00* (2006.01)
*F16C 19/00* (2006.01)
*F16C 43/04* (2006.01)
*F16C 23/10* (2006.01)
*F16H 48/20* (2012.01)

(52) U.S. Cl.
USPC ........... 384/583; 384/473; 384/562; 384/563; 475/230

(58) Field of Classification Search
USPC ......... 384/286, 462, 473, 559, 561, 562, 563, 384/581, 583, 584, 585, 906; 475/220, 222, 475/230, 246
See application file for complete search history.

(56) References Cited

U.S. PATENT DOCUMENTS

| 2,922,319 | A | * | 1/1960 | Burner | 475/90 |
| 3,261,230 | A | * | 7/1966 | Rudnicki | 475/240 |
| 3,715,936 | A | * | 2/1973 | Jones | 475/246 |
| 6,318,201 | B1 | | 11/2001 | Yoshioka | |
| 7,393,141 | B2 | * | 7/2008 | Fahrni et al. | 384/583 |
| 7,837,588 | B2 | * | 11/2010 | Valente | 475/249 |
| 7,997,804 | B2 | * | 8/2011 | Koda et al. | 384/556 |
| 8,444,323 | B2 | * | 5/2013 | Bostwick | 384/585 |
| 8,475,320 | B2 | * | 7/2013 | Kwon | 475/230 |
| 2007/0269157 | A1 | * | 11/2007 | Fahrni et al. | 384/569 |

* cited by examiner

*Primary Examiner* — Marcus Charles
*Assistant Examiner* — Adam D Rogers
(74) *Attorney, Agent, or Firm* — Brooks Kushman P.C.

(57) ABSTRACT

A bearing adjuster assembly is provided. The bearing adjuster assembly may have a housing, a bearing, an adjuster ring, a retainer ring, and a seal assembly. The adjuster ring exerts a force upon the bearing. The retainer ring inhibits rotation of the adjuster ring. The seal assembly inhibits movement of the retainer ring.

20 Claims, 2 Drawing Sheets

BEARING ADJUSTER ASSEMBLY

TECHNICAL FIELD

The present application relates to a bearing adjuster assembly.

BACKGROUND

A bearing pre-load mechanism for a motor vehicle differential is disclosed in U.S. Pat. No. 6,318,201.

SUMMARY

In at least one embodiment, a bearing adjuster assembly is provided. The bearing adjuster assembly may include a housing, a bearing, an adjuster ring, a retainer ring, and a seal assembly. The bearing may be disposed in a hole in the housing. The adjuster ring may engage the housing and exert a force upon the bearing. The retainer ring may have a set of inner prongs and a set of outer prongs. The set of inner prongs may engage the adjuster ring. The set of outer prongs may engage the housing to inhibit rotation of the adjuster ring. The seal assembly may engage the retainer ring to inhibit movement of the retainer ring.

In at least one embodiment, a bearing adjuster assembly may be provided. The bearing adjuster assembly may include a housing, a bearing, a shaft, an adjuster ring, a retainer ring, and a seal assembly. The housing may have a hole and a threaded portion. The bearing may be disposed in the hole. The shaft may be rotatably supported by the bearing and may be configured to rotate about an axis. The adjuster ring may have a threaded outside diameter that engages the threaded portion of the housing and exert a force on the bearing. The retainer ring may be disposed in the hole and may have a set of inner prongs and a set of outer prongs. The set of inner prongs may extend from an inside diameter of the retainer ring to engage the adjuster ring. The set of outer prongs may extend from an outside diameter of the retainer ring toward the housing to inhibit movement of the adjuster ring. The seal assembly may be disposed in the hole and may engage and inhibit movement of the retainer ring.

In at least one embodiment, a bearing adjuster assembly is provided. The bearing adjuster assembly may include a housing, a bearing, an adjuster ring, a seal assembly, and a retainer ring. The housing may have a first circumferential surface, a second circumferential surface, and a third circumferential surface that at least partially define a hole. The seal assembly may engage the first circumferential surface. The adjuster ring may threadingly engage the second circumferential surface. The bearing may engage the third circumferential surface. The retainer ring may be disposed between the adjuster ring and the seal assembly. The seal assembly may inhibit axial movement of the retainer ring. The retainer ring may inhibit axial movement of the adjuster ring.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
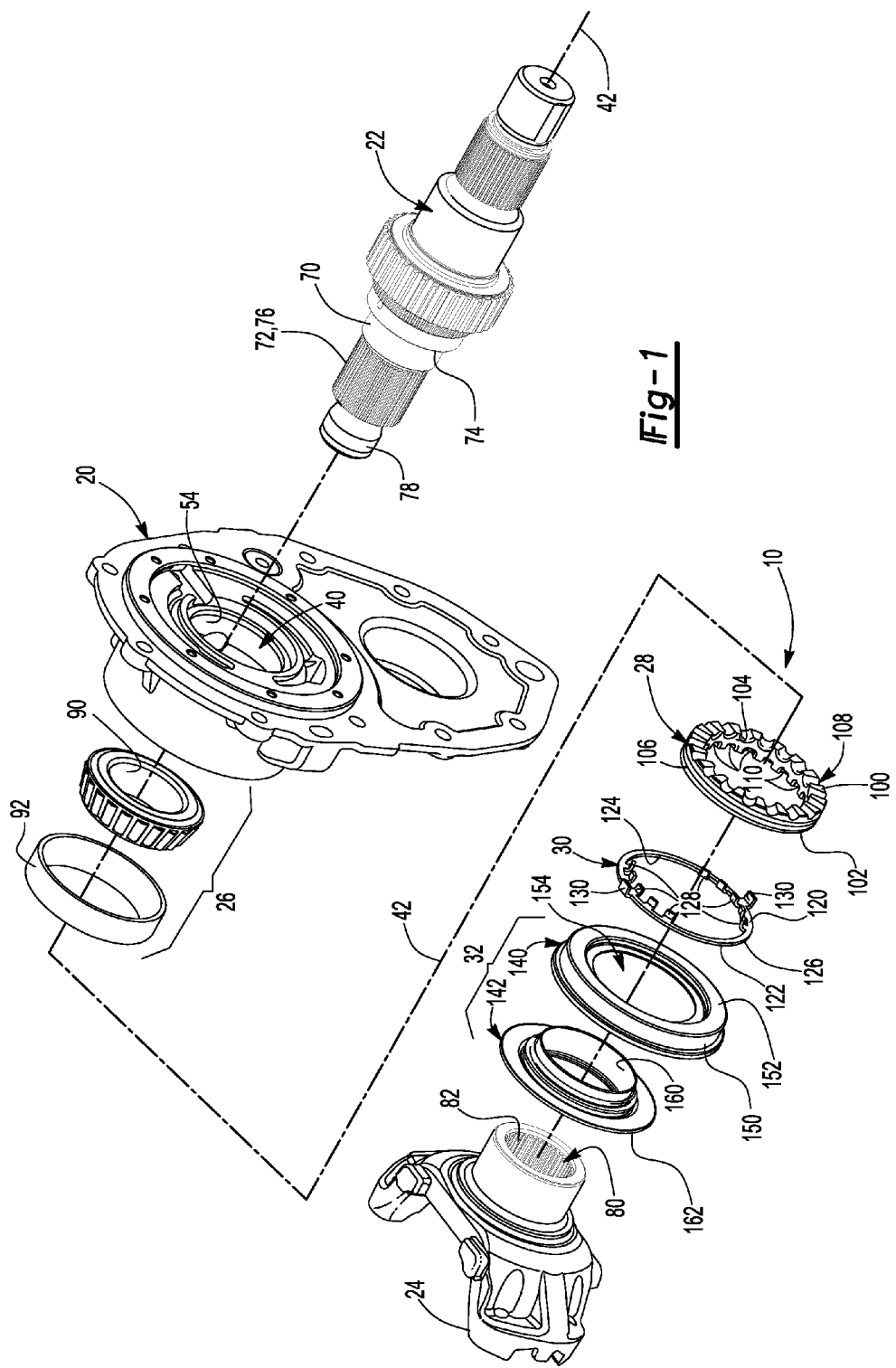
FIG. 1 is an exploded view of a bearing adjuster assembly.
Figure 2:
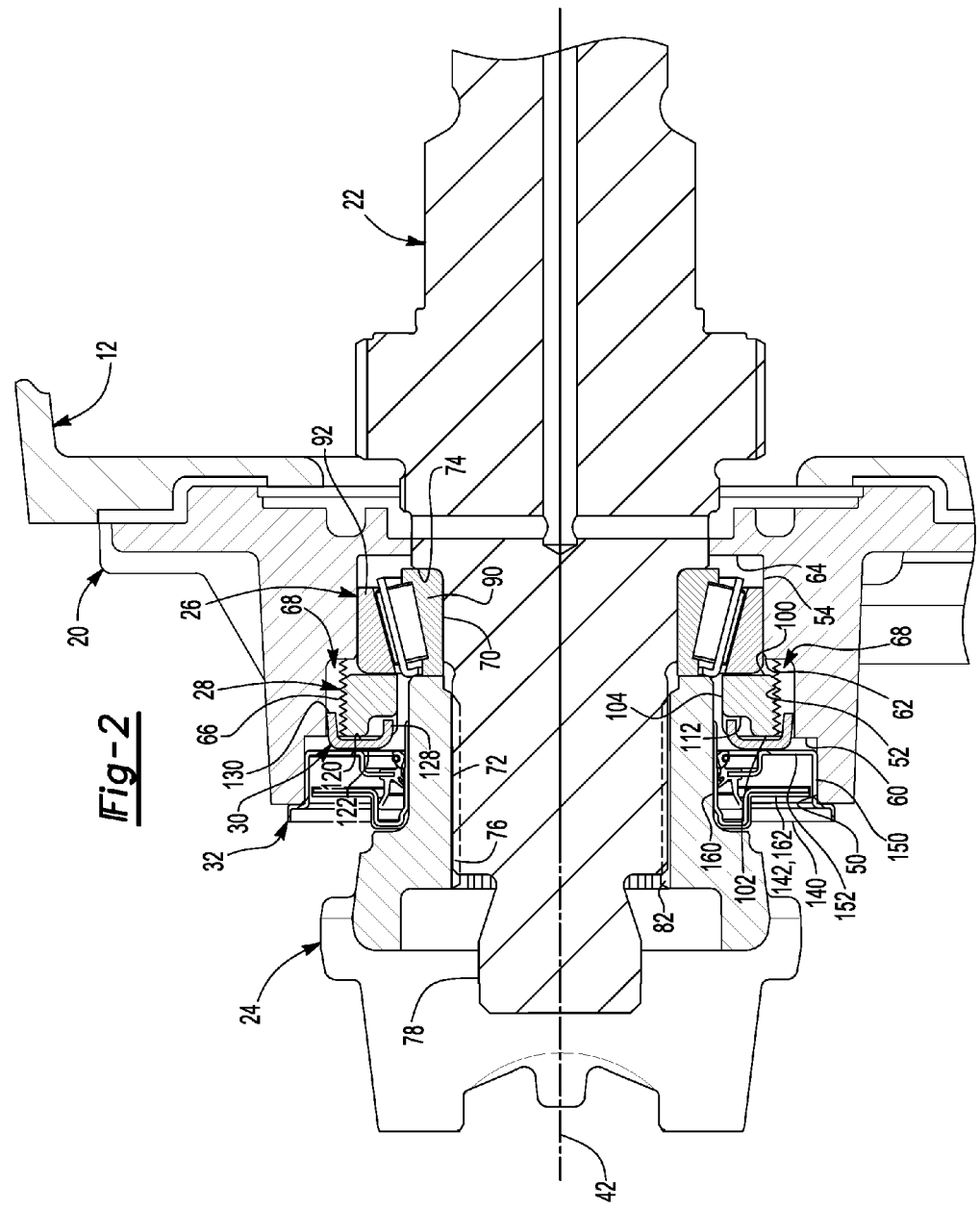
FIG. 2 is a section view of the bearing adjuster assembly through a center axis.

Referring to FIGS. 1 and 2, an exemplary bearing adjuster assembly 10 is shown. The bearing adjuster assembly 10 may be provided as part of a vehicle, such as a motor vehicle like a truck, bus, farm equipment, military transport or weaponry vehicle, or cargo loading equipment for land, air, or marine vessels. In a vehicular application, the bearing adjuster assembly 10 may be provided as part of a vehicle driveline or drivetrain component 12, such as an axle assembly, differential, or transaxle. In FIGS. 1 and 2, the drivetrain component 12 is configured as an axle assembly that may be coupled an input shaft and at least one traction wheel assembly. In at least one embodiment of a vehicle having a tandem axle configuration, the bearing adjuster assembly 10 may be provided on a forward tandem axle assembly. The drivetrain component 12 and the bearing adjuster assembly 10 may be disposed under the chassis of the vehicle and may be exposed to environmental contaminants, such as water, snow, mud, dirt, dust, aggregate, or corrosive substances. In at least one embodiment, the bearing adjuster assembly 10 may include a housing 20, a shaft 22, a yoke 24, a bearing 26, an adjuster ring 28, a retainer ring 30, and a seal assembly 32.

The housing 20 may support the bearing adjuster assembly 10. In at least one embodiment, the housing 20 may be part of the drivetrain component 12. For example, the housing 20 may be configured as an end plate that may be fastened to another housing portion of the drivetrain component 12.

The housing 20 may include a hole 40 that may extend along an axis 42 and a plurality of circumferential surfaces that may at least partially define the hole 40. The circumferential surfaces may be located between opposing surfaces of the housing 20 and may be arranged to form a plurality of steps. For instance, the housing 20 may include a first circumferential surface 50, a second circumferential surface 52, and a third circumferential surface 54. The diameters of the circumferential surfaces 50, 52, 54 may progressively decrease in size. For instance, the first circumferential surface 50 may have a larger diameter than the second circumferential surface 52, which may have a larger diameter than the third circumferential surface 54. The circumferential surfaces 50, 52, 54 may also be located next to each other such that a sequence of step surfaces are provided. For instance, a first step surface 60 may extend from the first circumferential surface 50 to the second circumferential surface 52, a second step surface 62 may extend from the second circumferential surface 52 to the third circumferential surface 54, and a third step surface 64 may extend from the third circumferential surface 54.

The second circumferential surface 52 may include a threaded portion 66 that may generally extend around the second circumferential surface 52. In addition, a set of slots 68 may be provided proximate the second circumferential surface 52. The set of slots 68 may include one or more members. Each slot 68 may have any suitable configuration. For example, each slot 68 may have a generally rectangular profile and may extend axially, or generally in the same direction as the axis 42. In at least one embodiment, each slot 68 may extend from the first step surface 60 toward or to the second step surface 62. In addition, each slot 68 may be recessed with respect to the second circumferential surface 52, or disposed further from the axis 42 than the second circumferential surface 52. As such, each slot 68 may at least partially interrupt or create a gap in the threaded portion 66. In the embodiment shown, two slots 68 are provided that are spaced apart and may be disposed opposite each other.

The shaft 22 may extend through the hole 40 and may be configured to rotate about the axis 42. The shaft 22 may include a plurality of exterior circumferential surfaces. For instance, the shaft 22 may include a first shaft surface 70 and a second shaft surface 72.

The first shaft surface 70 may be generally aligned with the third circumferential surface 54 and may be configured to engage the bearing 26. A shaft step surface 74 may extend radially from the first shaft surface 70 to facilitate positioning of the bearing 26.

The second shaft surface 72 may include a spline 76 that facilitates assembly with the yoke 24. In at least one embodiment, the second shaft surface 72 may be disposed adjacent to the first shaft surface 70 and may have a smaller diameter than the first shaft surface 70.

The shaft 22 may also include an end portion 78 that may be disposed near or next to the second shaft surface 72. The end portion 78 may be threaded in one or more embodiments.

The yoke 24 may facilitate coupling of the bearing adjuster assembly 10 to another component, such as an input shaft as previously discussed. In at least one embodiment, the yoke 24 may be configured as part of a universal joint. The yoke 24 may be fixedly disposed on the shaft 22 in any suitable manner. For instance, the yoke 24 may include a center bore 80 that may have a spline 82 that mates with the spline 76 on the shaft 22. In addition, one or more fasteners, such as a washer and a nut, may be disposed on the end portion 78 of the shaft 22 and may be used to secure the yoke 24 to the shaft 22. As such, the yoke 24 may be configured to rotate with the shaft 22 about the axis 42.

The bearing 26 may be disposed in the hole 40 and may rotatably support the shaft 22. The bearing 26 may be of any suitable type, such as a roller bearing. The bearing 26 may be inserted into the hole 40 prior to receiving of the shaft 22 or may be press fit onto the shaft 22 prior to insertion into the hole 40. In at least one embodiment, the bearing 26 may be disposed about the axis 42 and may include an inner race 90 and an outer race 92.

The inner race 90 may engage a surface of the shaft 22, such as the first shaft surface 70. In addition, an end surface of the inner race 90 may engage the shaft step surface 74 to help inhibit axial movement with respect to the shaft 22.

The outer race 92 may be disposed opposite the inner race 90. The outer race 92 may engage the third circumferential surface 54 of the housing 20.

The adjuster ring 28 may be configured to exert a force upon the bearing 26 to adjust or set endplay, or axial movement or positioning of the assembly of the shaft 22 and bearing 26 that may be due to clearances between the components. The adjuster ring 28 in combination with the other components of the bearing adjuster assembly 10 may provide a compact and streamlined design for adjusting and setting endplay.

The adjuster ring 28 may include a first surface 100, a second surface 102, an inside diameter 104, and an outside diameter 106.

The first surface 100 may face toward and may engage the bearing 26. The first surface 100 may include a set of lubrication grooves 108 that facilitate lubrication of the bearing 26. Members of the set of lubrication grooves 108 may be spaced apart from each other and may extend radially from the inside diameter 104 to the outside diameter 106.

The second surface 102 may be disposed opposite the first surface 100. A set of indentations 110 may be provided in the second surface 102. Each indentation 110 may extend from the second surface 102 toward the first surface 100. In addition, each indentation 110 may extend radially from the inside diameter 104 toward the outside diameter 106. Members of the set of indentations 110 may be spaced apart from each other and each indentation 110 may include a bottom surface 112. In one or more embodiments, each member of the set of indentations 110 may be offset from a member of the set of lubrication grooves 108. As such each member of the set of indentations 110 may not be aligned with and may not be disposed directly opposite a member of the set of lubrication grooves 108.

The inside diameter 104 may be spaced apart from the shaft 22 and the yoke 24 to facilitate rotation of the shaft 22.

The outside diameter 106 may be disposed opposite the inside diameter 104. The outside diameter 106 may be at least partially threaded. As such, the threaded outside diameter 106 may mate with the threaded portion 66 of the housing 20 to permit the adjuster ring 28 to be rotated about the axis 42 to exert force upon the bearing 26 and adjust or set endplay. In one or more embodiments, the position of the adjuster ring 28 may be set or adjusted by hand without specialized assembly tools.

The retainer ring 30 may be configured to inhibit rotation of the adjuster ring 28. The retainer ring 30 may include a first surface 120, a second surface 122, an inside diameter 124, an outside diameter 126, a set of inner prongs 128, and a set of outer prongs 130.

The first surface 120 may face toward the adjuster ring 28. In addition, the first surface 120 may or may not engage the adjuster ring 28 depending on the position of the adjuster ring 28 with respect to the housing 20 and/or the length of the inner prongs 128. The first surface 120 may be disposed opposite the second surface 122.

The set of inner prongs 128 may extend from the inside diameter 124. An inner prong may be have any suitable configuration and may be configured as a tab, spline, protrusion, or other feature for engaging and positioning the adjuster ring 28. Members of the set of inner prongs 128 may be spaced apart from each other and may extend toward the adjuster ring 28. More specifically, each member of the set of inner prongs 128 may be received in a corresponding member of the set of indentations 110 on the adjuster ring 28. At least one member of the set of inner prongs 128 may engage at least one surface that defines a corresponding member of the set of indentations 110. As such, at least one member of the set of inner prongs 128 inhibits rotation of the adjuster ring 28 when the retainer ring 30 is inhibited from rotating about the axis 42. The set of inner prongs 128 may have at least one member and may have fewer members than the set of indentations 110 in one or more embodiments. In addition, members of the set of inner prongs 128 may not engage the bottom surface 112 of a corresponding member of the set of indentations 110 depending on the length of the inner prongs 128 and/or position of the adjuster ring 28.

The set of outer prongs 130 may extend from the outside diameter 126 and may be spaced apart from the set of inner prongs 128. Members of the set of outer prongs 130 may be spaced apart from each other and may be received in a corresponding slot 68 in the housing 20. As such, each member of the set of outer prongs 130 may engage at least one surface of the housing 20 that defines a corresponding slot 68, thereby inhibiting rotation of the retainer ring 30 about the axis 42. The outer prongs 130 may have any suitable configuration. For instance, the outer prongs 130 may extend radially from the outside diameter 126 and away from the axis 42, at an angle with respect to the outside diameter 126 and/or axis 42, or combinations thereof. For instance, an outer prong 130 may extend radially from the outside diameter 126 and then axially toward the second step surface 62 of the housing 20, thereby providing a generally L-shaped configuration that may provide additional surface area that may be disposed in a slot 68 for engagement with the housing 20. Each outer prong 130 may or may not engage the outside diameter of the adjuster ring 28. In addition, members of the set outer prongs 130 may be longer than members of the set of inner prongs 128 or extend further from the first surface 120 in one or more embodiments.

The seal assembly 32 may be provided to inhibit bearing lubricant leakage, inhibit entry of contaminants, and to hold the retainer ring 30 in position. For example, the seal assembly 32 may engage the second surface 122 of the retainer ring 30 to inhibit disengagement of the retainer ring 30 from the adjuster ring 28 or axial movement of the retainer ring 30 along the axis 42. The seal assembly 32 may be press fit into a gap located between the yoke 24 and the first circumferential surface 50 of the housing 20 and may be held in position without the use of a fastener. As such, the seal assembly 32 may not have any fastener holes or fastener openings that could provide a leak path for bearing lubricant.

In at least one embodiment, the seat assembly 32 may include a seal ring 140 and a seal plate 142.

The seal ring 140 may include a first wall 150, a second wall 152 and an opening 154. The first wall 150 may define an outside diameter of the seal assembly 32. The first wall 150 may engage the first circumferential surface 50 of the housing 20. The second wall 152 may extend from the first wall 150 toward the axis 42. The second wall 152 may engage the second surface 122 of the adjuster ring 28.

The seal plate 142 may be received in the seal ring 140. The seal plate 142 may include an inner wall 160 and a flange 162. The inner wall 160 may define an inside diameter of the seal assembly 32. The inner wall 160 may extend through the opening 154 of the seal ring 140 and may encircle and engage an outside diameter of the yoke 24. The flange 162 may generally extend from an end of the inner wall 160 to or toward the first wall 150. As such, the seal ring 140 and seal plate 142 may cooperate to provide a seal between the housing 20 and the yoke 24.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bearing adjuster assembly comprising:
   a housing having a hole;
   a bearing disposed in the hole;
   an adjuster ring that engages the housing and exerts a force upon the bearing;
   a retainer ring having a set of inner prongs that engage the adjuster ring and a set of outer prongs that engage the housing to inhibit rotation of the adjuster ring; and
   a seal assembly that engages the retainer ring to inhibit movement of the retainer ring.

2. The bearing adjuster assembly of claim 1 wherein the housing includes a threaded portion and the adjuster ring includes a threaded outside diameter that mates with the threaded portion to facilitate positioning of the adjuster ring.

3. The bearing adjuster assembly of claim 2 wherein the housing includes a set of slots that are disposed adjacent to the threaded portion, wherein each member of the set of outer prongs is disposed in a corresponding member of the set of slots.

4. The bearing adjuster assembly of claim 1 wherein at least one member of the set of outer prongs extends from an outside diameter of the retainer ring.

5. The bearing adjuster assembly of claim 4 wherein at least one member of the set of outer prongs extends toward the bearing.

6. The bearing adjuster assembly of claim 5 wherein each member of the set of outer prongs is longer than each member of the set of inner prongs.

7. The bearing adjuster assembly of claim 1 wherein each member of the set of outer prongs is disposed between the housing and the adjuster ring.

8. The bearing adjuster assembly of claim 1 further comprising a shaft that is rotatably supported by the bearing and configured to rotate about an axis and a yoke that receives the shaft, wherein the seal assembly extends completely around the yoke and is disposed between and engages the yoke and the housing.

9. A bearing adjuster assembly comprising:
   a housing having a hole and a threaded portion;
   a bearing disposed in the hole;
   a shaft that is rotatably supported by the bearing and configured to rotate about an axis;
   an adjuster ring having a threaded outside diameter that engages the threaded portion and that exerts a force on the bearing;
   a retainer ring that is disposed in the hole and has a set of inner prongs that extend from an inside diameter of the retainer ring to engage the adjuster ring and a set of outer prongs that extend from an outside diameter of the retainer ring toward the housing to inhibit movement of the adjuster ring; and
   a seal assembly disposed in the hole that engages and inhibits movement of the retainer ring.

10. The bearing adjuster assembly of claim 9 wherein the adjuster ring includes a first surface having a set of lubrication grooves that extend radially with respect to the axis.

11. The bearing adjuster assembly of claim 10 wherein the set of lubrication grooves extend from an inside diameter of the adjuster ring to an outside diameter of the adjuster ring.

12. The bearing adjuster assembly of claim 9 wherein the adjuster ring includes a second surface having a set of indentations, wherein at least one member of the set of inner prongs is received in a member of the set of indentations.

13. The bearing adjuster assembly of claim 12 wherein each member of the set of indentations extends from an inside diameter of the adjuster ring toward an outside diameter of an adjuster ring.

14. The bearing adjuster assembly of claim 12 wherein the adjuster ring includes a first surface that is disposed opposite the second surface and that has a set of lubrication grooves that extend radially with respect to the axis, wherein each member of the set of lubrication grooves is offset from each member of the set of indentations.

15. The bearing adjuster assembly of claim 9 wherein members of the set of inner prongs are spaced apart from each other.

16. A bearing adjuster assembly comprising:
   a housing having a hole that is disposed along an axis and a first circumferential surface, a second circumferential surface, and a third circumferential surface that at least partially define the hole;

a seal assembly that engages the first circumferential surface; and an adjuster ring that threadingly engages the second circumferential surface;

a bearing that engages the third circumferential surface;

a retainer ring disposed between the adjuster ring and the seal assembly;

wherein the seal assembly inhibits axial movement of the retainer ring and the retainer ring inhibits axial movement of the adjuster ring.

17. The bearing adjuster assembly of claim 16 wherein the first circumferential surface has a larger diameter than the second circumferential surface and the second circumferential surface has a larger diameter than the third circumferential surface.

18. The bearing adjuster assembly of claim 16 wherein the housing includes a slot disposed proximate the second circumferential surface, wherein the slot receives an outer prong that extends from the retainer ring.

19. The bearing adjuster assembly of claim 16 wherein the slot extends substantially parallel to the axis.

20. The bearing adjuster assembly of claim 16 further comprising a shaft that is rotatably supported by the bearing, wherein the adjuster ring and retainer ring are spaced apart from the shaft.

\* \* \* \* \*

UNITED STATES PATENT AND TRADEMARK OFFICE
CERTIFICATE OF CORRECTION

| | | |
|---|---|---|
| PATENT NO. | : 8,616,780 B2 | Page 1 of 1 |
| APPLICATION NO. | : 13/350879 | |
| DATED | : December 31, 2013 | |
| INVENTOR(S) | : Dale Kwasniewski et al. | |

It is certified that error appears in the above-identified patent and that said Letters Patent is hereby corrected as shown below:

In the Claims

Column 6, Line 52, Claim 13:

After "diameter of" delete "an" and
Insert -- the --.

Column 7, Line 20, Claim 19:

After "bearing adjuster assembly of claim" delete "16" and
Insert -- 18 --.

Signed and Sealed this
Twenty-ninth Day of April, 2014

Michelle K. Lee
*Deputy Director of the United States Patent and Trademark Office*